(12) United States Patent
Taylor

(10) Patent No.: US 7,325,794 B2
(45) Date of Patent: Feb. 5, 2008

(54) AIR SPRING ASSEMBLY AND METHOD

(75) Inventor: Robert W. Taylor, Indianapolis, IN (US)

(73) Assignee: BFS Diversified Products, LLC, Indianapolis, IN (US)

( * ) Notice: Subject to any disclaimer, the term of this patent is extended or adjusted under 35 U.S.C. 154(b) by 121 days.

(21) Appl. No.: 11/146,183

(22) Filed: Jun. 6, 2005

(65) Prior Publication Data

US 2006/0273501 A1    Dec. 7, 2006

(51) Int. Cl.
*F16F 9/04* (2006.01)
(52) U.S. Cl. .................. 267/64.27; 267/64.24
(58) Field of Classification Search ............. 267/64.27, 267/64.24, 64.19, 64.23
See application file for complete search history.

(56) References Cited

U.S. PATENT DOCUMENTS

| | | | |
|---|---|---|---|
| 3,000,624 A | 9/1961 | Cislo | |
| 3,244,013 A | 4/1966 | Deschner | |
| 3,788,628 A | 1/1974 | Hotz, Jr. et al. | |
| 3,870,286 A | 3/1975 | Willich | |
| 4,037,305 A | 7/1977 | Larsson | |
| 4,489,474 A | 12/1984 | Brown et al. | |
| 4,564,177 A | 1/1986 | Leonard | |
| 4,573,692 A | 3/1986 | Frank et al. | |
| 4,629,170 A | 12/1986 | Warmuth, II | |
| 4,657,229 A | 4/1987 | Thurow | |
| 4,690,430 A | 9/1987 | Buma | |
| 4,718,650 A | 1/1988 | Geno | |
| 4,722,516 A * | 2/1988 | Gregg | 267/64.27 |
| 4,784,376 A | 11/1988 | Ecktman | |
| 4,787,606 A | 11/1988 | Geno et al. | |
| 4,787,607 A | 11/1988 | Geno et al. | |
| 4,793,598 A | 12/1988 | Geno et al. | |
| 4,852,861 A | 8/1989 | Harris | |
| 4,899,995 A | 2/1990 | Hoffman et al. | |
| 4,946,144 A | 8/1990 | Geno et al. | |
| 5,005,808 A | 4/1991 | Warmuth, II et al. | |
| 5,267,725 A | 12/1993 | Wode et al. | |
| 5,342,139 A | 8/1994 | Hoffman | |
| 5,374,037 A | 12/1994 | Bledsoe | |
| 5,460,354 A | 10/1995 | Easter | |
| 5,535,994 A | 7/1996 | Safreed, Jr. | |
| 5,859,692 A | 1/1999 | Ross, Jr. et al. | |
| 5,941,509 A | 8/1999 | Avesian et al. | |
| 6,036,180 A | 3/2000 | Ecktman | |
| 6,345,813 B1 | 2/2002 | Trowbridge | |
| 6,474,630 B1 | 11/2002 | Weitzenhof | |

(Continued)

FOREIGN PATENT DOCUMENTS

DE    101 06 016 A 1    9/2001

(Continued)

*Primary Examiner*—Bradley King
(74) *Attorney, Agent, or Firm*—Matthew P. Dugan; Thomas R. Kingsbury

(57) ABSTRACT

An air spring assembly including a first end member that includes a side wall, and a second end member spaced from the first end member. A flexible sleeve includes a sleeve wall and opposing open ends secured on the first and second end members. First and second retaining member are used to secure one open end of the flexible sleeve on the associated end member. A method is also disclosed.

21 Claims, 4 Drawing Sheets

U.S. PATENT DOCUMENTS

| | | |
|---|---|---|
| 6,513,798 B2 | 2/2003 | Capek et al. |
| 6,520,492 B1 | 2/2003 | Branco et al. |
| 6,561,500 B2 | 5/2003 | Schisler et al. |
| 6,619,635 B1 | 9/2003 | Hilburger et al. |
| 6,637,733 B1 | 10/2003 | Weitzenhof et al. |
| 6,698,730 B2 | 3/2004 | Easter |
| 6,749,184 B2 | 6/2004 | Wode et al. |
| 6,783,121 B2 | 8/2004 | Bank et al. |
| 2002/0153646 A1 | 10/2002 | Weitzenhof |
| 2004/0012131 A1 | 1/2004 | Bank et al. |

FOREIGN PATENT DOCUMENTS

| | | |
|---|---|---|
| DE | 103 40 091 A1 | 3/2005 |
| EP | 0 000 287 A1 | 1/1979 |
| EP | 1 031 756 A2 | 8/2000 |
| GB | 911789 | 11/1962 |
| GB | 1 249 532 | 10/1971 |
| WO | WO 2004/067989 A1 | 8/2004 |
| WO | WO 2005/024265 A1 | 3/2005 |

\* cited by examiner

AIR SPRING ASSEMBLY AND METHOD

BACKGROUND

The present novel concept broadly relates to the art of fluid suspension members and, more particularly, to an air spring assembly suitable for operation at increased air pressures as well as a corresponding method of manufacturing the same.

Air spring assemblies of various kinds and constructions are well known and commonly used. Furthermore, such air spring assemblies are typically available in a wide variety of sizes and load capacities. Even so, air spring applications continue to be developed that demand greater air spring performance, often in increasingly smaller packages. Such improvements in performance can include increased load capacity and greater stroke length, for example.

One way that the load capacity of a given air spring assembly can be increased is by increasing the air pressure within the spring chamber thereof. As such, it is also possible to use an air spring assembly having a reduced size (e.g., a reduced diameter), while maintaining a given load capacity at the desired nominal height, by operating such an air spring at a corresponding higher air pressure level. It will be appreciated that air spring assemblies are typically operable over a range of nominal air pressures. However, operation of an air spring at a pressure level slightly outside this range will normally be well within the capabilities of known air spring designs.

It will be appreciated, though, that operating an air spring assembly of traditional construction at a significantly increased air pressure level, such as at about double the nominal pressure level, for example, can lead to the development of various problems and difficulties. For example, in some cases the flexible wall extending between the end members of the air spring assembly may not be suitable for operation at greater pressure levels. Recently, though, improved flexible wall materials have been developed that are better suited for operation at these increased pressure levels.

Another difficulty that can develop with the operation of known air spring assemblies at such elevated air pressure levels is related to the securement of the flexible wall to the end members of the air spring assembly. That is, in such arrangements, leak paths can develop between the flexible wall and an end member of the air spring in areas that normally form a fluid-tight seal at standard operating pressures. This is undesirable, and can lead to increased consumption of compressed air as well as decreased performance of the air spring assembly and/or any associated system. Additionally, it is in some cases even possible for some amount of separation of the flexible wall from the end member to occur. This can undesirably result in movement of the sleeve and/or any retaining member relative to the end member.

Attempts have been made to overcome these problems by increasing the retaining force generated by the retaining member, such as by crimping or otherwise more tightly deforming the retaining member toward the sleeve and end member, for example. However, such attempts have generally met with marginal success and the development of leaks and even some movement of the flexible sleeve and retaining member remain problematic.

Other attempts have been made to improve the fluid-tight connection between the flexible sleeve and the corresponding end member by utilizing a retaining member having a greater height. These efforts have met with some success in certain applications. However, such arrangements tend to undesirably increase the length of the end member and thereby reduce the travel or operating stroke of the air spring assembly. As indicated above, it is generally desirable to increase the operating stroke of the air spring assembly and/or reduce the overall size thereof. Thus, in many applications a retaining member arrangement that increases the size of the end member and/or reduces the stroke of the air spring assembly is not desirable.

BRIEF DESCRIPTION

An exemplary embodiment of an air spring assembly in accordance with the present novel concept is provided and includes a first end member that includes a first side wall. A second end member is spaced from the first and member. The air spring assembly also includes first and second retaining members, and a flexible spring member that extends between the first and second end members. The flexible spring member includes opposing first and second open ends. The first open end includes a first portion and a second portion, and the second open end is secured on the second end member. The first open end is at least partially received on the first end member such that the first portion is disposed along the first side wall. The first retaining member is disposed along the first portion opposite the first side wall. The second portion extends along the first retaining member opposite the first portion. The second retaining member is disposed along the second portion opposite the first retaining member.

Another exemplary embodiment of an air spring assembly in accordance with the present novel concept is provided and includes a top cap that includes an end wall and a side wall. A piston is spaced from the top cap, and a flexible sleeve extends between the top cap and the piston to at least partially form a spring chamber therebetween. The flexible sleeve includes an inner surface, an outer surface, a first open end and an opposing second open end. The first open end includes an intermediate sleeve portion and a distal sleeve portion. The first open end receives the top cap such that the inner surface of the intermediate sleeve portion extends along at least a portion of the side wall. A first retaining member is secured along the outer surface of the intermediate sleeve portion. The distal portion extends along the first retaining member such that the inner surface of the flexible sleeve along the distal sleeve portion is outwardly exposed. A second retaining member is secured along the distal sleeve portion outwardly of the first retaining member.

An exemplary method of manufacturing an air spring assembly is provided and includes providing a first end member, a second end member and a flexible spring member. The first end member includes a side wall and an outer peripheral edge. The flexible spring member includes opposing open ends with a first open end that includes a first portion and a second portion. The method also includes installing the flexible spring member on the first end member such that the first portion extends along the side wall. The method further includes positioning a first retaining member along the first portion of the flexible spring member and securing the flexible spring member along the side wall of the first end member using the first retaining member. The method still further includes positioning the second portion of the flexible spring member along the first retaining member such that the second portion extends therealong opposite the first portion. The method also includes positioning a second retaining member along the second portion opposite the first retaining member and securing the flexible spring member along the first end member using the second retaining member. The method further includes securing the second open end of the flexible spring member on the second end member.

DETAILED DESCRIPTION

Figure 1:
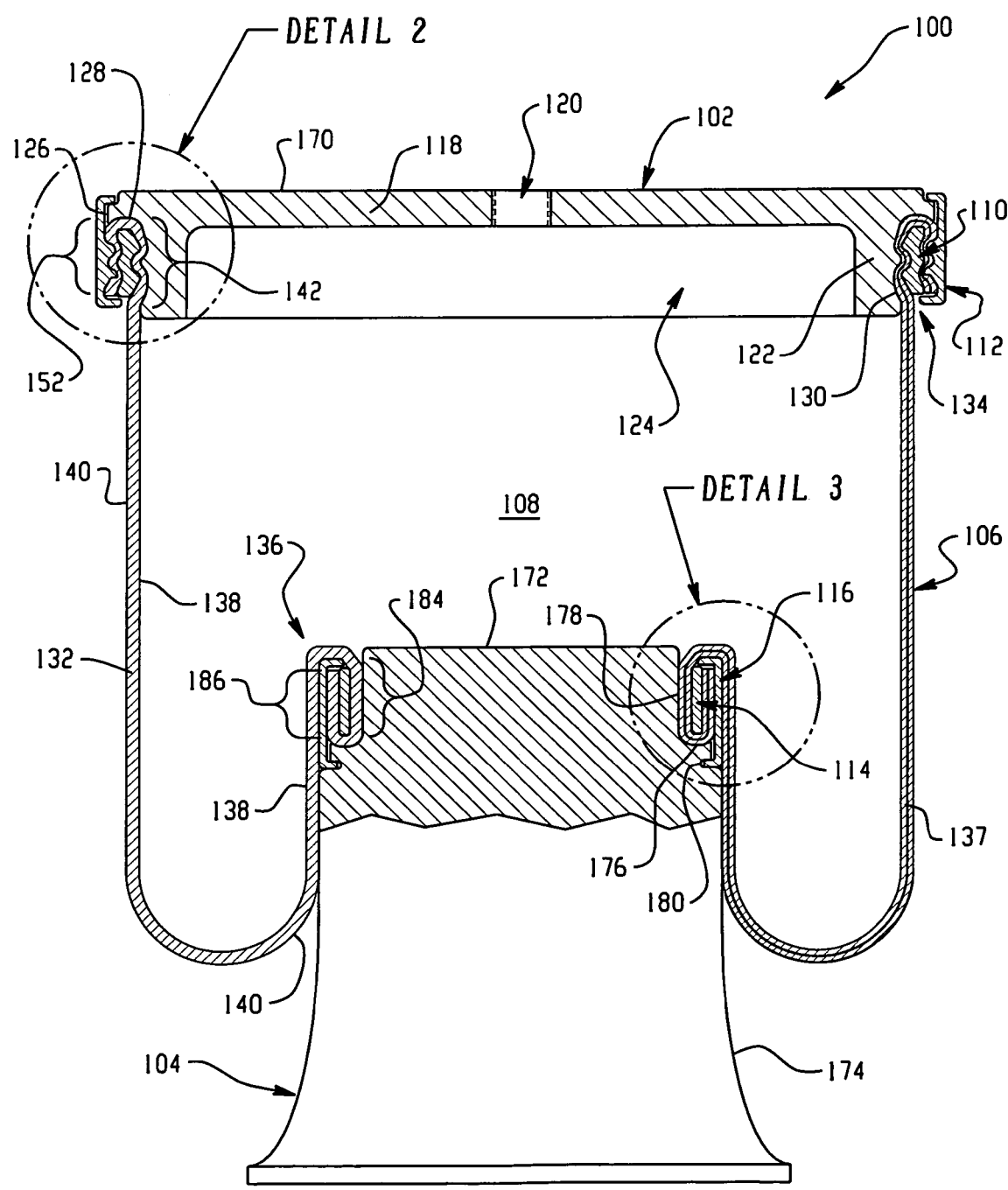
FIG. 1 is a side view in partial cross section of an air spring assembly in accordance with the present novel concept.

Turning now to the drawings wherein the showings are for the purpose of illustrating exemplary embodiments of the present novel concept, and not for the purpose of limiting the same, FIG. 1 shows an air spring assembly 100 that includes a first end member, such as a top cap 102, for example, a second end member, such as a piston 104, for example, and a flexible wall, such as a sleeve 106, for example, at least partially defining a spring chamber 108 therebetween. Air spring assembly 100 is shown and described herein as being a rolling lobe-type air spring. However, it is to be understood that the present novel concept is capable of broad use in association with any suitable type, kind or configuration of air spring. Thus, the following discussion of the present novel concept, which includes particular reference to air spring assembly 100 and its components, is merely exemplary.

Sleeve 106 is secured on top cap 102 using retaining members 110 and 112. Additionally, sleeve 106 is secured on piston 104 using retaining members 114 and 116. Though both sets of retaining members 110-112 and 114-116 are shown in use in FIG. 1, it is to be understood that use along both end members of an air spring assembly is optional. As such, dual retaining members of either construction can be used along either or both of the end members without departing from the present novel concept.

Top cap 102 includes an end wall 118 having a threaded passage 120 formed therethrough and in fluid communication with spring chamber 108. Passage 120 can be of any size, shape and/or configuration suitable for the connection of a fluid line, such as by receiving a fluid line connector fitting, for example. Additionally, suitable securement members (not shown), such as mounting studs or mounting holes, for example, can be provided on end wall 118 for mounting the air spring on an associated structural member. A side wall 122 extends from end wall 118 and together with the end wall at least partially forms a recess 124 in top cap 102. It will be appreciated, however, that recess 124 is optional and that any suitable top cap construction or arrangement can be used, including top caps with or without a recess, such as recess 124. If included, however, a recess, such as recess 124, for example, can act to reduce weight and can also increase the stroke length of the air spring. Top cap 102 includes an outer peripheral edge 126 and, in the exemplary embodiment shown, side wall 122 is inwardly spaced from edge 126 forming a shoulder or undercut 128 adjacent an outer surface 130 of side wall 122. It will be appreciated, however, that any other suitable arrangement of top cap or other end member could alternately be used.

Flexible sleeve 106 is formed from a sleeve wall 132 that extends between opposing open ends 134 and 136. It will be appreciated that sleeve wall 132 can be of any suitable construction, such as a wall including an elastomeric material, for example. Additionally, sleeve wall 132 can optionally include reinforcing cords 137 formed from any suitable construction or cord material. In one exemplary embodiment, sleeve wall can be formed from rubber and can include reinforcing cords formed from nylon or aramid fibers.

Figure 2:
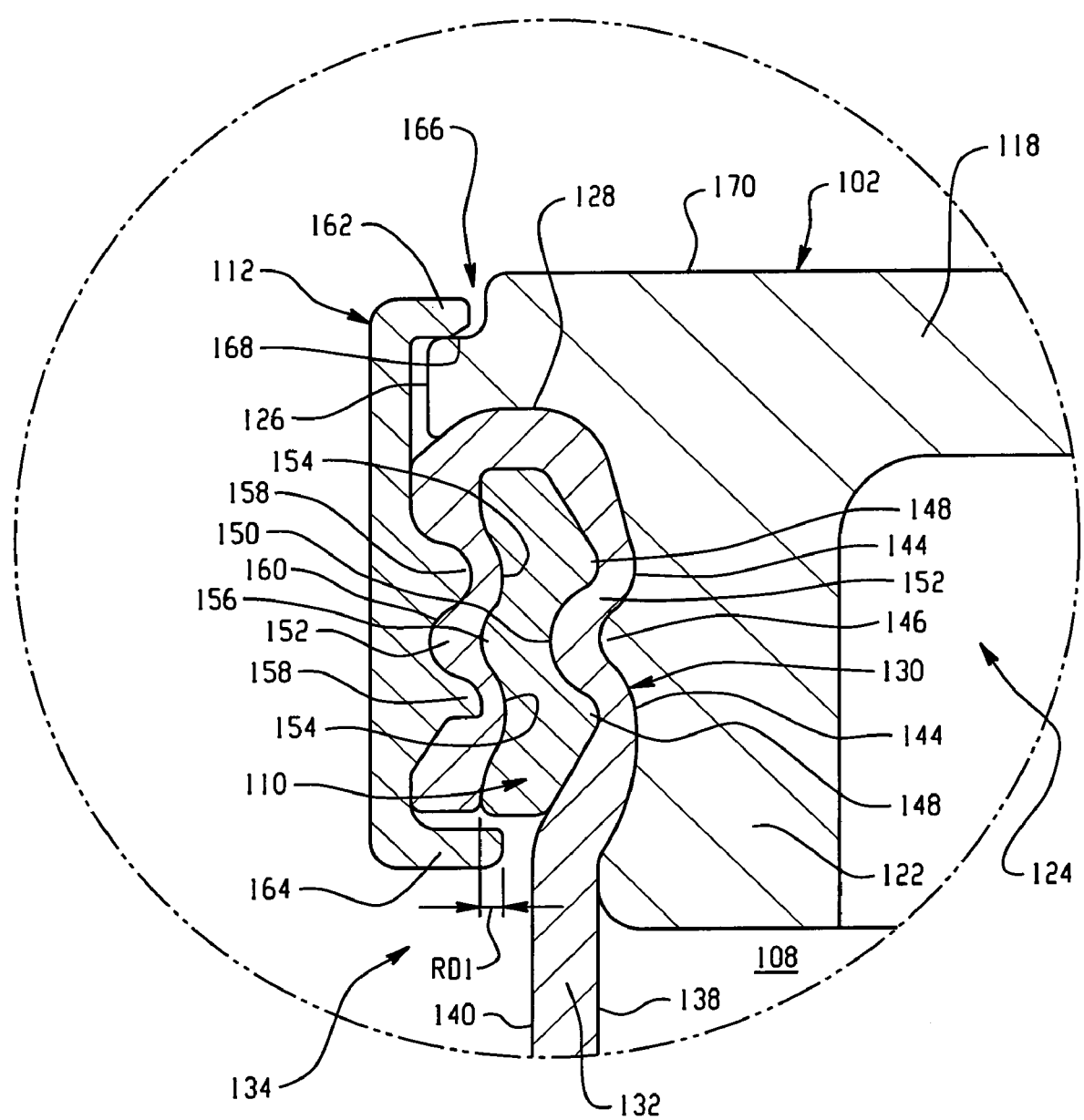
FIG. 2 is an enlarged detail view of the portion of the air spring assembly in DETAIL 2 of FIG. 1.

Sleeve wall 132 includes an inner surface 138 generally disposed toward spring chamber 108 and an outer surface 140 opposite the inner surface. Sleeve 106 is disposed along top cap 102 such that an intermediate portion 142 of sleeve wall 132 adjacent open end 134 extends along outer surface 130 of side wall 122. In this exemplary arrangement, inner surface 138 of the sleeve wall is adjacent the side wall of the top cap. As can be better seen in FIG. 2, one or more sleeve-engaging features, such as grooves 144 and rib 146, for example, can optionally be provided along outer surface 130 of side wall 122. If provided, the sleeve-engaging features assist in securing flexible sleeve 106 along side wall 122.

Retaining member 110 is disposed outwardly from side wall 122 and intermediate portion 142, and extends peripherally there around acting to secure intermediate portion 142 along side wall 122 and form a substantially fluid-tight seal therebetween. In one exemplary embodiment, retaining member 110 is a circular ring that is swaged, crimped or otherwise mechanically inwardly deformed to compress intermediate portion 142 and form the substantially fluid-tight seal with side wall 122. Retaining member 110 can optionally include sleeve-engaging features, such as ribs 148 and a groove 150, for example, which can optionally correspond to grooves 144 and ribs 146, if provided.

A distal portion 152 of sleeve wall 132 extends along retaining member 110 outwardly thereof opposite intermediate portion 142. In one exemplary embodiment, sleeve wall 132 is substantially cylindrical along open end 134 and distal portion 152 is folded over retaining member 110. However, it will be appreciated that other arrangements can alternately be used without departing from the principles of the present novel concept. Retaining member 112 is disposed along distal portion 152 outwardly thereof. In addition to sleeve-engaging features such as ribs 148 and groove 150, retaining member 110 can also, or alternately, include optional sleeve-engaging features, such as grooves 154 and rib 156, for example. Additionally, or in the alternative, retaining member 112 can optionally include suitable sleeve-engaging features, such as ribs 158 and groove 160, for example, which can optionally be generally cooperative with grooves 154 and rib 156, if provided.

Retaining member 112 can also optionally include either or both of inwardly extending annular flanges 162 and 164 disposed along opposing ends of the retaining member. If included, flange 162 extends inwardly beyond peripheral edge 126 of top cap 102 and engages the top cap to register, index or otherwise generally limit the movement of retaining member 112 toward piston 104. In the embodiment in FIGS. 1 and 2, an optional peripheral relief 166 is included along top cap 102 forming a peripheral shoulder 168 that flange 162 engages. This permits flange 162 to be recessed from a top surface 170 of top cap 102 providing a substantially planar surface for engaging a corresponding structural member (not shown). Flange 164 is shown extending inwardly beyond at least a portion of retaining member 110, as is indicated by dimension RD1. Flange 164, if provided, can act to minimize the movement of retaining member 110 toward piston 104. Thus, it will be appreciated that any suitable overlap sufficient to cause engagement of flange 164 and retaining member 110 can be used. One example of a suitable range for overlap dimension RD1 is from about 0.032 inches to about 0.063 inches. Flanges 162 and 164 are shown and described herein as being substantially continuous annular flanges. However, it is to be understood that flanges 162 and/or 164, if provided, can take any suitable form, shape and/or configuration, including extending in either a continuous or intermittent manner, such as circumferentially spaced tabs, for example.

Open end 136 of sleeve 106 can be secured along an end member, such as piston 104, for example, in any suitable manner. In the exemplary embodiment shown in FIGS. 1 and 3, open end 136 is secured along piston 104 using retaining members 114 and 116. However, it is to be appreciated that the use of an arrangement in accordance with the present novel concept on a second end member is optional.

Figure 3:
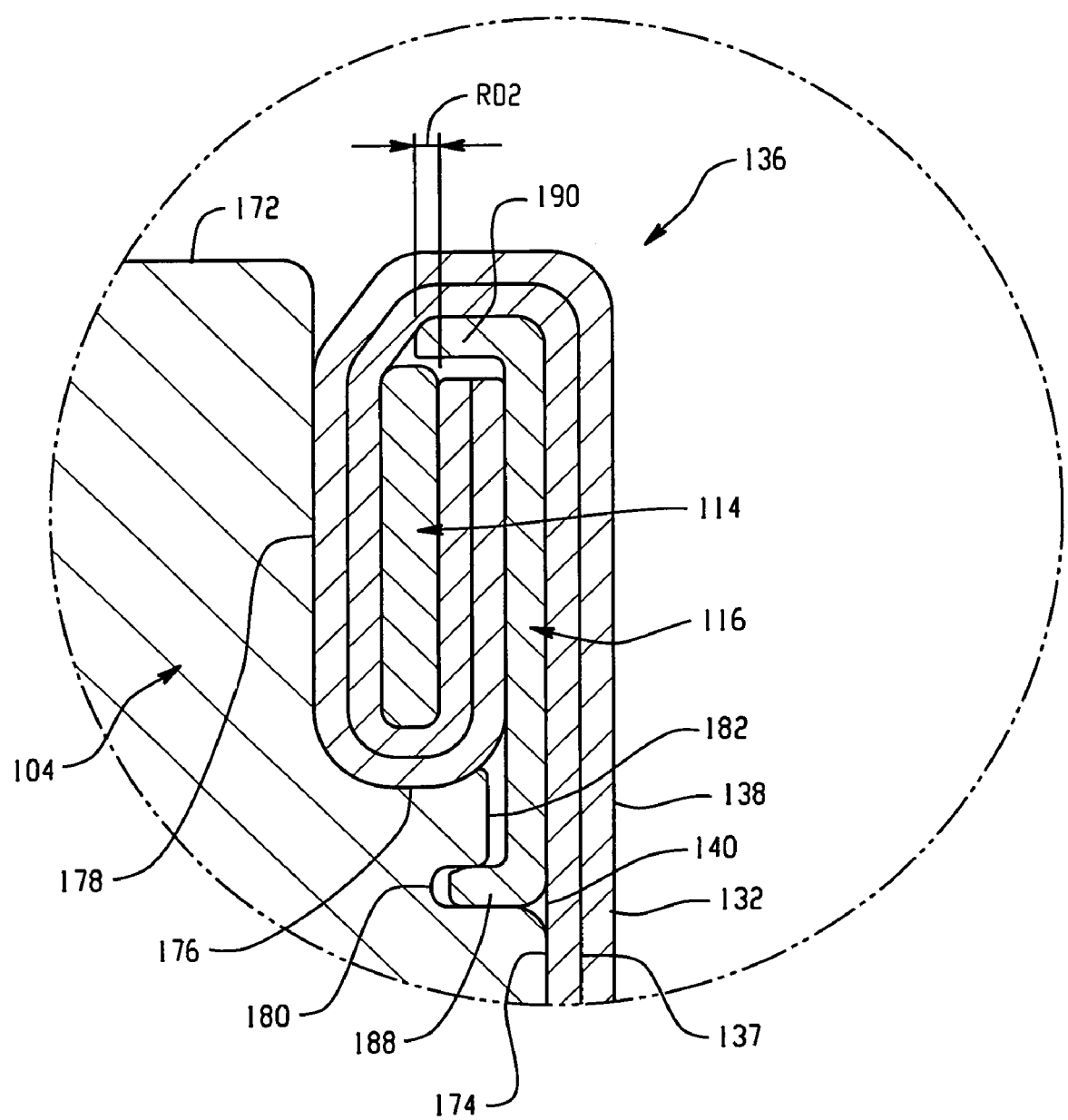
FIG. 3 is an enlarged detail view of the portion of the air spring assembly in DETAIL 3 of FIG. 1.

In the present exemplary embodiment, as shown in FIGS. 1 and 3, piston 104 includes a top or end wall 172 and a side wall 174. A shoulder 176 is formed along side wall 174 adjacent top wall 172 and extends inwardly from side wall 174. Shoulder 176 includes a shoulder side wall 178 that extends between the shoulder and top wall 172. Additionally, an inwardly extending groove 180 is formed in side wall 174 and is spaced from shoulder 176 in a direction opposite top wall 172. An intermediate wall section 182 extends between shoulder 176 and groove 180, and in the exemplary embodiment shown is spaced inwardly from side wall 174.

Sleeve wall 132 adjacent open end 136 includes an intermediate portion 184 and a distal portion 186, as shown in FIG. 1. The sleeve wall is assembled on piston 104 such that outer surface 140 of sleeve wall 132 is disposed along side wall 174. Intermediate portion 184 of open end 136 is positioned along shoulder side wall 178 such that inner surface 138 of the sleeve wall is disposed toward the shoulder side wall. Retaining member 114 is received along outer surface 140 of intermediate portion 184 and acts to form a substantially fluid-tight seal between intermediate portion 184 and shoulder side wall 178. Distal portion 186 of sleeve wall 132 extends along retaining member 114 outwardly of intermediate portion 184. In one exemplary embodiment, sleeve wall 132 is substantially cylindrical and distal portion 186 is folded over to extend along retaining member 114. However, it will be appreciated that other arrangements can alternately be used without departing from the principles of the present novel concept.

Retaining member 116 is positioned adjacent inner surface 138 of sleeve wall 132 along distal portion 186 thereof and acts to displace the same toward retaining member 114. Retaining member 116 can optionally include inwardly extending annular flanges 188 and 190. As discussed with regard to flanges 162 and 164, flanges 188 and 190, though shown and described herein as being substantially continuous annular flanges, can be of any suitable shape, kind and/or configuration, including either continuous or intermittent flanges, such as circumferentially spaced tabs, for example. Annular flange 188, if provided, can engage groove 180 to register, index or otherwise orient and retain retaining member 116 on piston 104.

Annular flange 190, if provided, extends radially inwardly beyond at least a portion of retaining member 114, as indicated by dimension RD2. Thus, retaining member 114 is captured between shoulder 176 and flange 190. Using such an arrangement along either or both end member, as discussed above, captures the retaining members on the end member and, therefore, can act to substantially limit the movement of the retaining members relative to the associated end member. Both the inner and outer retaining members can be captured on the end member using if the flanges of the outer retaining member are included.

Furthermore, the use of both inner and outer retaining members substantially increases the surface area of the sleeve wall that is frictionally engaged by the end member and retaining members compared to traditional designs. This results in a corresponding substantial increase in clamping force applied on the sleeve wall. The resulting increase in clamping force along with the limited movement of the captured retaining members results in a substantially robust connection between the flexible sleeve and the associated end member without any substantial increase in the length of the connection.

Figure 4:
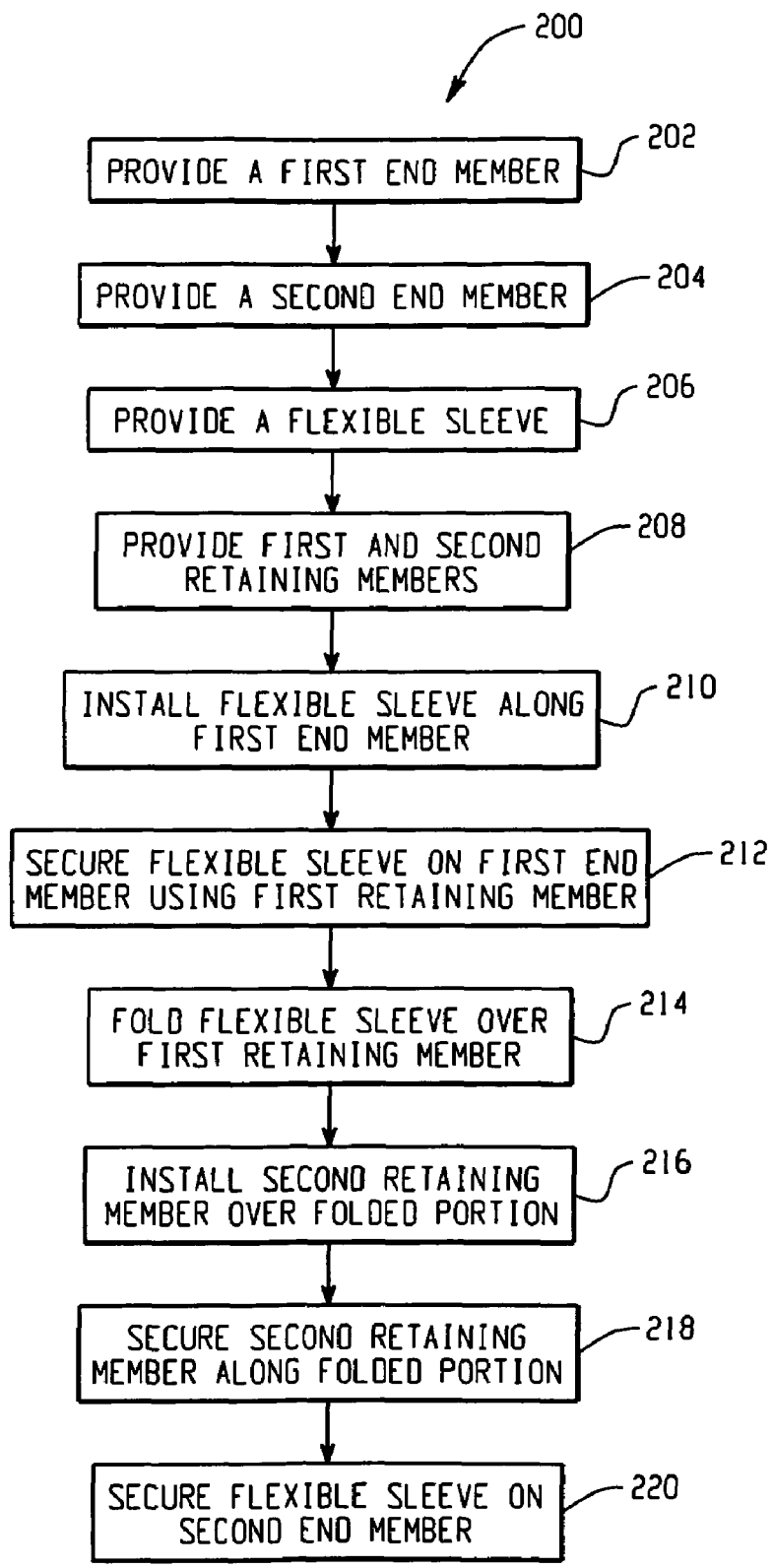
FIG. 4 is a flow chart illustrating one exemplary method of manufacturing an air spring assembly in accordance with the present novel concept.

One example of a suitable method 200 of manufacturing an air spring assembly in accordance with the present novel concept, such as air spring 100, for example, is shown in FIG. 4. Method 200 includes a step 202 of providing a first end member, such as top cap 102, for example. Another step 204 includes providing a second end member, such as piston 104, for example. Still another step 206 includes providing a flexible spring member, such as flexible sleeve 106, for example. A further step 208 includes providing first and second retaining members, such as retaining members 110 and 112 or retaining members 114 and 116, for example.

Another step 210 includes installing the flexible sleeve along the first end member. In one exemplary embodiment, the flexible sleeve is positioned along the first end member such that an intermediate sleeve portion, such as intermediate portion 142 or 184, for example, is disposed along a side wall of the first end member, such as side wall 122 or 174, for example. Still another step 212 includes securing the flexible sleeve on the first end member using the first retaining member. In one exemplary embodiment, the first retaining member, such as retaining member 110 or 114, for example, is positioned along the intermediate portion of the flexible sleeve opposite the associated side wall, and swaged, crimped or otherwise inwardly deformed to compressively secure the flexible sleeve between the first retaining member and the first end member. However, it is to be appreciated that any suitable deforming method can alternately be used.

A further step 214 includes positioning the flexible sleeve along another surface of the first retaining member. In one exemplary embodiment, a distal portion, such as distal portion 152 or 186, for example, of the flexible sleeve extends outwardly beyond the intermediate portion and is folded over the outer surface of the first retaining member. Still a further step 216 includes installing a second retaining member, such as retaining member 112 or 116, for example, over the folded portion of the flexible sleeve. In one exemplary embodiment, the second retaining member is positioned along the distal portion of the flexible sleeve. In another step 218, the second retaining member is swaged, crimped or otherwise inwardly deformed to compressively secure the distal portion of the flexible sleeve against the outer surface of the first retaining member.

Additionally, it will be appreciated that the second retaining member can include one of more inwardly extending flanges, such as flanges 162, 164, 188 and/or 190, for example. Such inwardly extending flanges, if provided, can be formed in any suitable manner and can be of any suitable type, kind and/or configuration, either continuous or discontinuous. For example, the one or more flanges could be provided on the retaining member prior to the same being secured along the distal portion of the flexible sleeve. In such an arrangement, the retaining member and flange or flanges are sufficiently oversized. This can permit the second retaining member to be positioned along the distal portion of the flexible sleeve with at least one of the flanges being able to move past the distal portion and first retaining member without engaging or otherwise contacting the same. Upon being inwardly deformed, one or more of the flanges will be inwardly displaced a sufficient distance to engage the end member and/or one or more of the flanges could be formed on the retaining member, such as from a straight wall or less pronounced feature, for example, during the inward deformation process or during a separate operation performed before and/or after the inward deformation process.

Yet a further step 220 includes securing the flexible sleeve on the second end member. It will be appreciated that step 220 can be performed in any suitable manner, such as by using a known connection or by repeating one or more of the foregoing steps to secure the opposing end of the flexible sleeve along the second end member using a connection in accordance with the present novel concept.

While the subject novel concept has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles of the subject novel concept. Obviously, modifications and alterations will occur to others upon reading and understanding the preceding detailed description. Accordingly, it is to be distinctly understood that the foregoing descriptive matter is to be interpreted merely as illustrative of the present novel concept and not as a limitation. As such, it is intended that the subject novel concept be construed as including all such modifications and alterations insofar as they come within the scope of the appended claims and any equivalents thereof.

The invention claimed is:

1. An air spring assembly comprising:
   a first end member including a first side wall;
   a second end member spaced from said first end member;
   a flexible spring member extending between said first and second end members and including opposing first and second open ends with a longitudinally-extending axis formed therebetween, said first open end including a first portion and a second portion, and said second open end being secured on said second end member; and,
   first and second retaining members, said second retaining member including a retaining member side wall and a flange extending inwardly from said retaining member side wall;
   said first open end at least partially received on said first end member such that said first portion is disposed along said first side wall;
   said first retaining member disposed along said first portion opposite said first side wall and compressively engaging said first portion to thereby form a substantially fluid-tight seal with said first side wall;
   said second portion of said first open end extending along said first retaining member opposite said first portion and terminating along said first retaining member such that at least a portion of said first retaining member remains exposed by said second portion; and,
   said second retaining member disposed along said second portion such that said retaining member side wall is opposite said first retaining member, said flange of said second retaining member extending inwardly beyond at least a portion of said first retaining member such that said flange can abuttingly engage said exposed portion of said first retaining member and thereby limit relative axial displacement between said first and second retaining members in at least a first direction.

2. An air spring assembly according to claim 1, wherein said first end member includes an outermost peripheral wall portion and said flange of said second retaining member extends radially inwardly beyond said outermost peripheral wall portion.

3. An air spring assembly according to claim 1, wherein said flange of said second retaining member is a first flange and said second retaining member includes a second flange spaced from said first flange and extending inwardly from said retaining member side wall.

4. An air spring assembly according to claim 3, wherein said second flange extends inwardly along at least a portion of said first end member such that said second flange can abuttingly engage said first end member and thereby limit relative axial displacement between said first retaining member, said second retaining member and said first end member in at least a second direction.

5. An air spring assembly according to claim 3, wherein at least one of said first flange or said second flange is a substantially continuous annular flange.

6. An air spring assembly according to claim 1, wherein said first portion of said first open end is an inwardly disposed portion thereof and said second portion of said first open end is an outwardly disposed portion thereof.

7. An air spring assembly according to claim 1 further comprising a third retaining member disposed along said second open end of said flexible spring member.

8. An air spring assembly according to claim 4, wherein said first end member includes a recess extending along an outer peripheral portion thereof, and at least a portion of said second flange extends into said recess.

9. An air spring assembly according to claim 1, wherein said second portion of said first open end is folded radially outwardly over said first retaining member.

10. An air spring assembly comprising:
    a first end member including an end wall and a side wall, said end wall including an outer end wall portion extending outwardly beyond said side wall;
    a second end member spaced from said first end member;
    a flexible sleeve extending between said first and second end members and at least partially forming a spring chamber therebetween, said flexible sleeve including an inner surface, an outer surface, a first open end and an opposing second open end, said first open end including an intermediate sleeve portion and a distal sleeve portion, and said first open end receiving said first end member such that said inner surface of said intermediate sleeve portion extends along at least a portion of said side wall, and said second open end secured along said second end member;
    a first retaining member secured along said outer surface of said intermediate sleeve portion and compressively engaging said intermediate sleeve portion with said side wall such that a substantially fluid-tight seal is formed therebetween, said distal sleeve portion being folded radially outwardly over said first retaining member such that said inner surface of said flexible sleeve along said distal sleeve portion is outwardly exposed, and said distal sleeve portion terminating along said first retaining member such that at least a portion thereof is exposed beyond said distal sleeve portion; and, a second retaining member secured along said distal sleeve portion outwardly of said first retaining member, said second retaining member including a side wall a flange extending from said side wall inwardly beyond at least a portion of said first retaining member, said flange being capable of abuttingly engaging said exposed portion of said first retaining member such that relative displacement of said first and second retaining members to one another can be limited in at least one direction.

11. An air spring assembly according to claim 10, wherein a portion of said flexible sleeve along said first open end thereof is in abutting engagement with said outer end wall portion of said first end member.

12. An air spring assembly according to claim 11, wherein said inner surface of said portion of said flexible sleeve is in abutting engagement with said outer end wall portion of said first end member.

13. An air spring assembly according to claim 10, wherein said flange extends radially inwardly along said first retaining member.

14. An air spring assembly according to claim 10, wherein said flange is a first flange and said second retaining member includes a second flange extending from said side wall and spaced from said first flange.

15. An air spring assembly according to claim 10, wherein said flange extends substantially continuously along said side wall of said second retaining member.

16. An air spring assembly according to claim 10, wherein at least one of said side wall of said first end member, said first retaining member or said second retaining member includes at least one of a sleeve-engaging groove or rib.

17. An air spring assembly according to claim 14, wherein said second flange extends inwardly beyond at least a portion of said first end member such that said second flange is capable of abuttingly engaging said first end member such that relative displacement of said first end member, said first retaining member and said second retaining member can be limited in at least a second direction.

18. An air spring assembly according to claim 17, wherein said first end member Includes a recess formed thereinto and at least a portion of said second flange of said second retaining member is received within said recess.

19. A method of manufacturing an air spring assembly, said method comprising:

a) providing a first end member, a second end member and a flexible wall, said first end member including an end wall, a side wall and an outer peripheral edge, said flexible wall including opposing first and second open ends with said first open end including a first wall portion and a second wall portion;

b) installing said flexible wall on said first end member such that said first wall portion extends along said side wall of said first end member;

c) positioning a first retaining member along said first wall portion of said flexible wall and securing said flexible wall along said side wall of said first end member using said first retaining member;

d) positioning said second wall portion of said flexible wall along said first retaining member such that said second wall portion extends therealong opposite said first wall portion and terminates along said first end member such that at least a portion of said first retaining member remains outwardly exposed;

e) positioning a second retaining member along said second wall portion outwardly of said first retaining member and capturing said flexible wall and said first retaining member on said first end member using said second retaining member;

f) forming a first flange on said second retaining member, said flange extending inwardly beyond at least a portion of said first retaining member such that said flange and said exposed portion of said first retaining member are capable of abutting engagement for limiting movement of said first and second retaining members relative to one another; and, g) securing said second open end of said flexible wall on said second end member.

20. A method according to claim 19 further comprising forming a second flange along said second retaining member in spaced relation to said first flange, said second flange extending inwardly beyond at least a portion of said outer peripheral edge of said first end member such that relative movement between said first end member, said first retaining member and said second retaining member can be limited.

21. A method according to claim 20, wherein providing a first end member in a) includes providing a first end member that includes a recess formed thereinto, and forming a second flange along said second retaining member includes positioning said second flange within said recess.

* * * * *